(12) United States Patent
Davidkovich et al.

(10) Patent No.: US 7,950,294 B2
(45) Date of Patent: May 31, 2011

(54) PREVENTIVE MAINTENANCE DIAGNOSTICS FOR VALVE SYSTEMS

(75) Inventors: Vladislav Davidkovich, Stoneham, MA (US); Gordon Hill, Arlington, MA (US)

(73) Assignee: MKS Instruments, Inc., Andover, MA (US)

(*) Notice: Subject to any disclaimer, the term of this patent is extended or adjusted under 35 U.S.C. 154(b) by 0 days.

(21) Appl. No.: 12/143,106

(22) Filed: Jun. 20, 2008

(65) Prior Publication Data

US 2009/0314074 A1    Dec. 24, 2009

(51) Int. Cl.
 *G01L 3/00* (2006.01)
(52) U.S. Cl. ......................... 73/862.08; 73/168
(58) Field of Classification Search ............... 73/168, 73/760, 862.08–862.195
See application file for complete search history.

(56) References Cited

U.S. PATENT DOCUMENTS

| | | | |
|---|---|---|---|
| 3,639,989 A * | 2/1972 | Rapsilber et al. | 33/1 SA |
| 3,956,831 A * | 5/1976 | Sibley | 33/352 |
| 4,091,664 A * | 5/1978 | Zerver | 73/862.21 |
| 4,623,828 A * | 11/1986 | Schmitz | 318/696 |
| 4,805,451 A * | 2/1989 | Leon | 73/168 |
| 4,912,586 A * | 3/1990 | Herron | 368/223 |
| 4,987,358 A * | 1/1991 | Branam | 318/603 |
| 5,033,012 A * | 7/1991 | Wohld | 702/41 |
| 5,207,204 A * | 5/1993 | Kawachi et al. | 123/533 |
| 5,704,392 A * | 1/1998 | Frew | 137/554 |
| 6,285,155 B1 * | 9/2001 | Maske et al. | 318/685 |
| 6,776,394 B2 | 8/2004 | Lucas | |
| 7,049,785 B2 * | 5/2006 | Han | 318/696 |
| 7,219,805 B2 * | 5/2007 | DeMaison | 209/246 |
| 7,369,920 B2 | 5/2008 | Davidkovich et al. | |

* cited by examiner

*Primary Examiner* — Max Noori
(74) *Attorney, Agent, or Firm* — McDermott Will & Emery LLP

(57) ABSTRACT

A valve system includes a valve and a controller that controls the valve. The valve includes a valve body, and a motor configured to deliver a torque to the valve body to cause the valve body to move between an open position and a closed position. The controller is configured to drive the motor by applying a current to the motor. The controller is configured to measure the torque delivered by the motor to the valve body, compare the calculated torque with a threshold value, and diagnose a need by the valve system for preventive maintenance when the calculated torque is substantially equal to the threshold value. The threshold value represents substantially the maximum amount of torque available from the stepper motor.

14 Claims, 5 Drawing Sheets

PREVENTIVE MAINTENANCE DIAGNOSTICS FOR VALVE SYSTEMS

BACKGROUND

Pressure control valves (such as pendulum valves and butterfly valves) used in vacuum chambers are often subject to a build-up of process gas contaminants on the vacuum wetted surfaces. These valves typically operate with very small clearances, so that when depositions occur on the valve surfaces, the motion of the valves is restricted. Typically, in these applications the valves use motors that deliver a higher torque, so that the motor can plow through the deposition while avoiding stepper motor slip, i.e. the inability to achieve the desired valve position. If a servo motor is utilized, rather than a stepper motor, the symptoms resulting from deposition buildup include the inability to maintain or achieve position setpoint.

Typically, users of the valves in these environments heat the valves to prevent deposition, i.e. to prevent condensation of process gasses. This is not always effective, however. Also, users of these valves in these environments typically perform a preventative maintenance (PM) cleaning of the valves, at certain time intervals. The PM generally involves removing the valve from the tool or vacuum chamber, and cleaning the valve mechanically or with a solvent. Because this cleaning causes tool downtime, it is performed as infrequently as possible. It is difficult to predict when the PM is needed, however, so the PM interval may result in being too short, causing excessive maintenance cost, or too long, causing valve and pressure control problems affect wafer production.

For these reasons, it would be desirable to be able to predict the need for cleaning valve systems, without relying on arbitrary PM intervals.

SUMMARY

A valve system includes a valve and a controller that controls the valve. The valve includes a valve body, and a motor configured to deliver a torque to the valve body to cause the valve body to move between an open position that allows a flow of a fluid, and a closed position that prevents the flow of the fluid. The controller is configured to drive the motor by applying a current to the motor. The controller is configured to measure the torque delivered by the motor to the valve body, compare the calculated torque with a threshold value, and detect a need by the valve system for preventive maintenance when the calculated torque is substantially equal to the threshold value.

BRIEF DESCRIPTION OF THE DRAWINGS

The drawings disclose illustrative embodiments. They do not set forth all embodiments. Other embodiments may be used in addition or instead. When the same numeral appears in different drawings, it is intended to refer to the same or like components or steps.

DETAILED DESCRIPTION

In the present disclosure, methods and systems are disclosed that allow users of a valve to predict or diagnose a need to clean the valves, so to prevent further deposit build-up that would cause motor slippage and valve malfunction. The methods and systems described below allow users to measure the torque delivered by the stepper motor in the valve, and to determine based on the calculated torque whether or not preventive maintenance such as cleaning is required.

Illustrative embodiments are now discussed. Other embodiments may be used in addition or instead.

Figure 1:
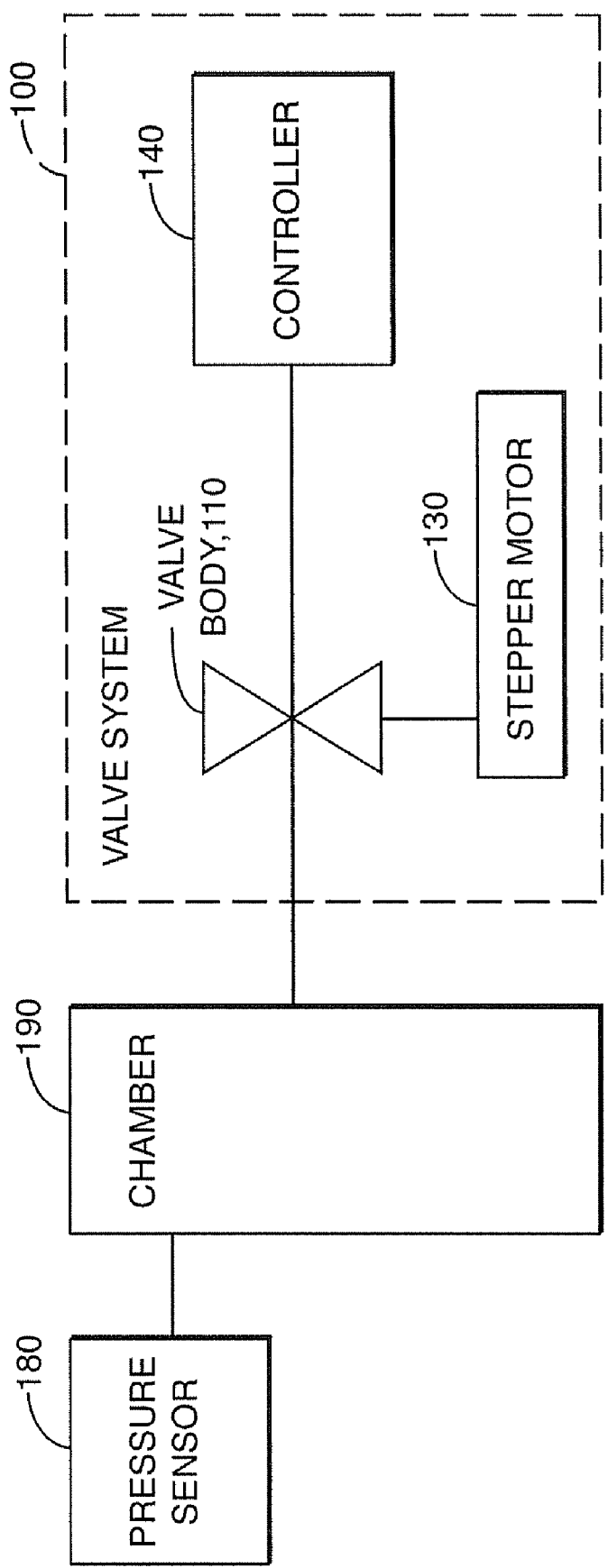
FIG. 1 schematically illustrates a system that predicts need for preventive cleaning in pressure control valves using torque measurements of a stepper motor, in accordance with one embodiment of the present disclosure.

FIG. 1 schematically illustrates one embodiment of a valve system that can predict the need for cleaning and/or other preventive maintenance, using torque measurements of a stepper motor. In overview, the valve system 100 includes a valve that comprises a valve body 110 and a motor 130. The valve system 100 further includes a controller 140 that controls the valve. The motor 130 is configured to apply a torque to the valve body 110 to cause the valve body 110 to move anywhere in between an open position that allows fluid to flow through the valve system, and a closed position that prevents fluid from flowing through the valve system. The motor may be a stepper motor. In one embodiment, a two phase stepper motor may be used.

In one embodiment illustrated in FIG. 1, the valve system 100 may be a pressure control valve system used in a pressure control system that controls the pressure of a fluid within a chamber 190. The pressure control valve system may regulate the flow of the fluid into and out of the chamber 190, thus regulating the pressure within the chamber 190. In this embodiment, the pressure control valve allows the fluid to flow into or out of the chamber 190 when the valve body is at the open position, and to prevent the fluid from flowing into the chamber when the valve body is at the closed position.

A pressure control system typically includes 1) a pressure sensor 180 (for example a capacitance manometer) that measures the pressure within the chamber 190; and 2) a pressure control valve and a controller 140 that controls the valve. Typically, a user controls that flow rate and mass of fluid entering the chamber 190, while the pressure in the chamber 190 is maintained at a desired value by the pressure control system. Typically, the controller 140 receives a signal from the pressure sensor 180 representing the pressure measurement, compares the signal to a desired pressure set point, then adjusts the position of the valve until the actual pressure is equal to the desired pressure set point.

A pressure control system is described for example in U.S. Pat. No. 7,369,920, entitled "Pressure Control System With Optimized Performance," commonly owned by the assignee of the current application and incorporated herein by reference in its entirety.

Many different types of valves may be used in the valve system, including but not limited to pendulum valves, butterfly valves, and throttle valves.

In an embodiment in which the valve is a pendulum valve, the pendulum valve may be contained within a hollow housing having an inlet opening and an outlet opening, through which fluid can enter and exit the interior of the housing. A pair of valve seats may be provided within the housing at the edges of each opening. In this embodiment, the valve body may be a disk, which, when driven by the motor, rotates from an open position to a closed position. The disk when in the open position allows fluid flow through the inlet opening. The disk when in the closed position comes into sealing contact with the valve seat at the edge of the inlet opening, preventing fluid flow through the inlet opening.

A pendulum valve is described for example in U.S. Pat. No. 6,776,394, entitled "Pendulum Valve Assembly", commonly owned by the assignee of the current application. Further details of the pendulum valve are disclosed in this patent, which is incorporated herein by reference in its entirety.

In the present disclosure, the controller 140 is configured to drive the motor 130 by applying one or more currents and/or voltages to the motor 130. The controller 140 is further configured to measure the torque delivered by the motor 130 to the valve body, compare the calculated torque with a threshold value, and diagnose a need by the valve system 100 for preventive maintenance when the calculated torque is substantially equal to the threshold value. The threshold value substantially represents the maximum amount of torque available from the stepper motor 130.

In one embodiment, the stepper motor 130 is a two phase stepper motor, which may be used as a permanent magnet synchronous machine. The controller drives the stepper motor with sinusoidal currents. The current control is implemented by a DSP (digital signal processor) for each phase of the two phase stepper motor.

In one embodiment, current control may be implemented by pulse-width modulation (PWM) of the phase voltages. In this embodiment, the duty cycles of the voltages determine the average voltage magnitude over the PWM period. The DSP controls the values of these duty cycles by closing the current control loop and therefore is in control of all switching operations.

In the present disclosure, the controller 140 uses a control algorithm to measure and to calculate the delivered torque, i.e. the torque delivered by the motor to the valve body. The value of the measured or delivered torque is compared to the maximum torque capability of the valve, in order to provide the user with a diagnostic that PM is required due to process deposition on the valve wetted surfaces.

In the present disclosure, the parameters of the stepper motor operation, in particular the currents and the voltages that are applied at each phase, are examined. Based on these parameters, the torque delivered at a specific point in the operation of the stepper motor is determined, and compared with a reference value that represents the torque that is needed at that point. Based on this comparison, the controller 140 decides whether or not preventive maintenance such as cleaning of the valve surfaces is needed.

The motor drive provides sinusoidal currents to the motor phases. As mentioned earlier, this makes a two-phase hybrid stepper motor equivalent to a generalized synchronous machine with the excitation provided by the permanent magnets. The assumptions on which the operation of the stepper motor 130 are based include, but are not limited to: linear magnetics, position-independent phase and mutual inductances, orthogonal phase currents, zero cogging torque.

Under the above assumptions, the voltage balance in the stepper motor 130 can be presented as:

$$v_A(t) = R_A i_A(t) + L_A \frac{di_A(t)}{dt} - L_m \frac{di_B(t)}{dt} + e_A(t),$$  Equation 1

$$v_B(t) = R_B i_B(t) + L_B \frac{di_B(t)}{dt} + L_m \frac{di_A(t)}{dt} + e_B(t)$$

In Equation 1 above:
$v_A(t)$, $v_B(t)$=phase voltages (in Volts);
$i_A(t)$, $i_B(t)$=phase currents (in Amps);
$e_A(t)$, $e_B(t)$=phase backemfs (in Volts);
$R_A$, $R_B$=stator resistances (in Ohms);
$L_A$, $L_B$=stator inductances (in Henry);
$L_m$=mutual inductance (in Henry).

The stator resistances and inductances are equal to each other: $R_A=R_B=R$, $L_A=L_B=L$.

Since all the time-dependent quantities in Equation 1 are sinusoidal, Equation 1 can be rewritten using phasor notations:

$$\vec{V}_A = R\vec{I}_A + j\omega L \vec{I}_A - j\omega L_m \vec{I}_B + \vec{E}_A,$$

$$\vec{V}_B = R\vec{I}_B + j\omega L \vec{I}_B + j\omega L_m \vec{I}_A + \vec{E}_B.$$  Equation 2

In Equation 2 above, $\omega$ represents electrical frequency, in the rad/sec.

Figure 2:
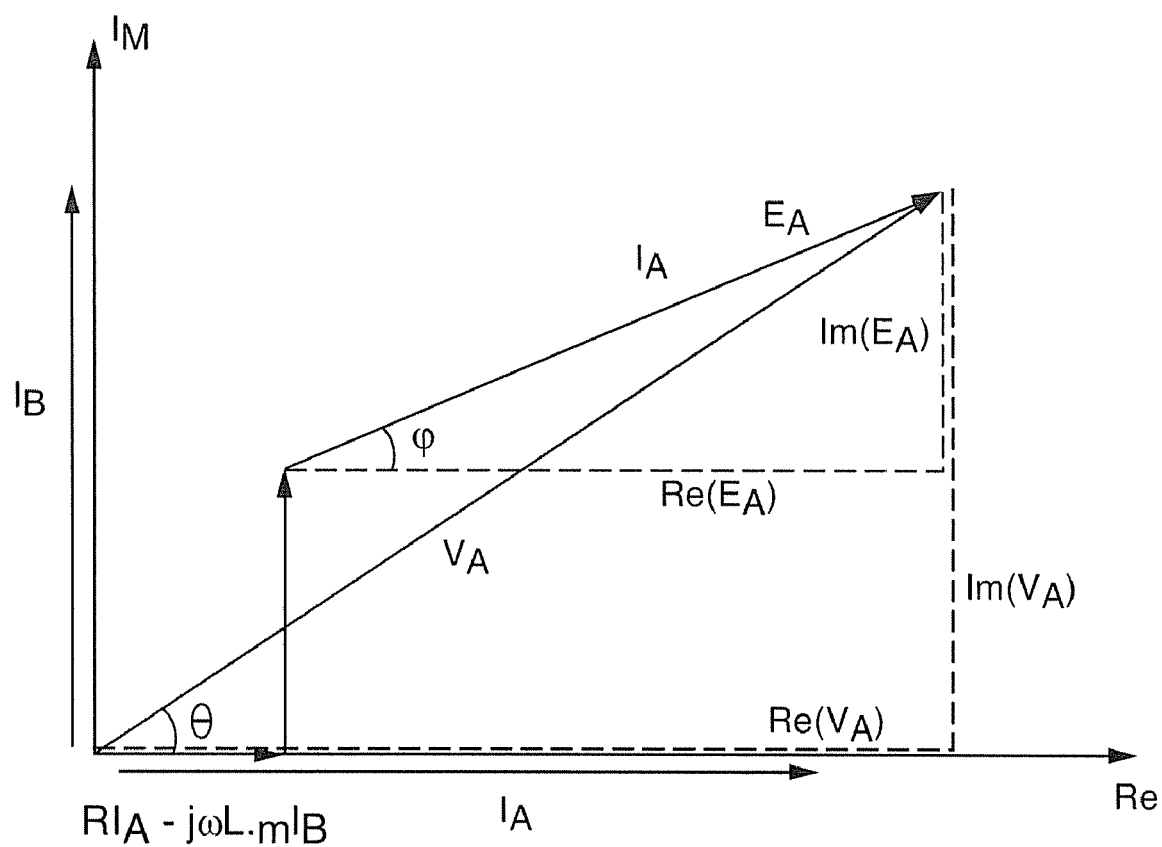
FIG. 2 is a vector diagram representing voltage balance in a stepper motor, in one embodiment of the present disclosure.

Equation 2 above can be conveniently represented by a vector (phasor) diagram, shown in FIG. 2 which illustrates the voltage balance in the stepper motor 130.

Figure 3:
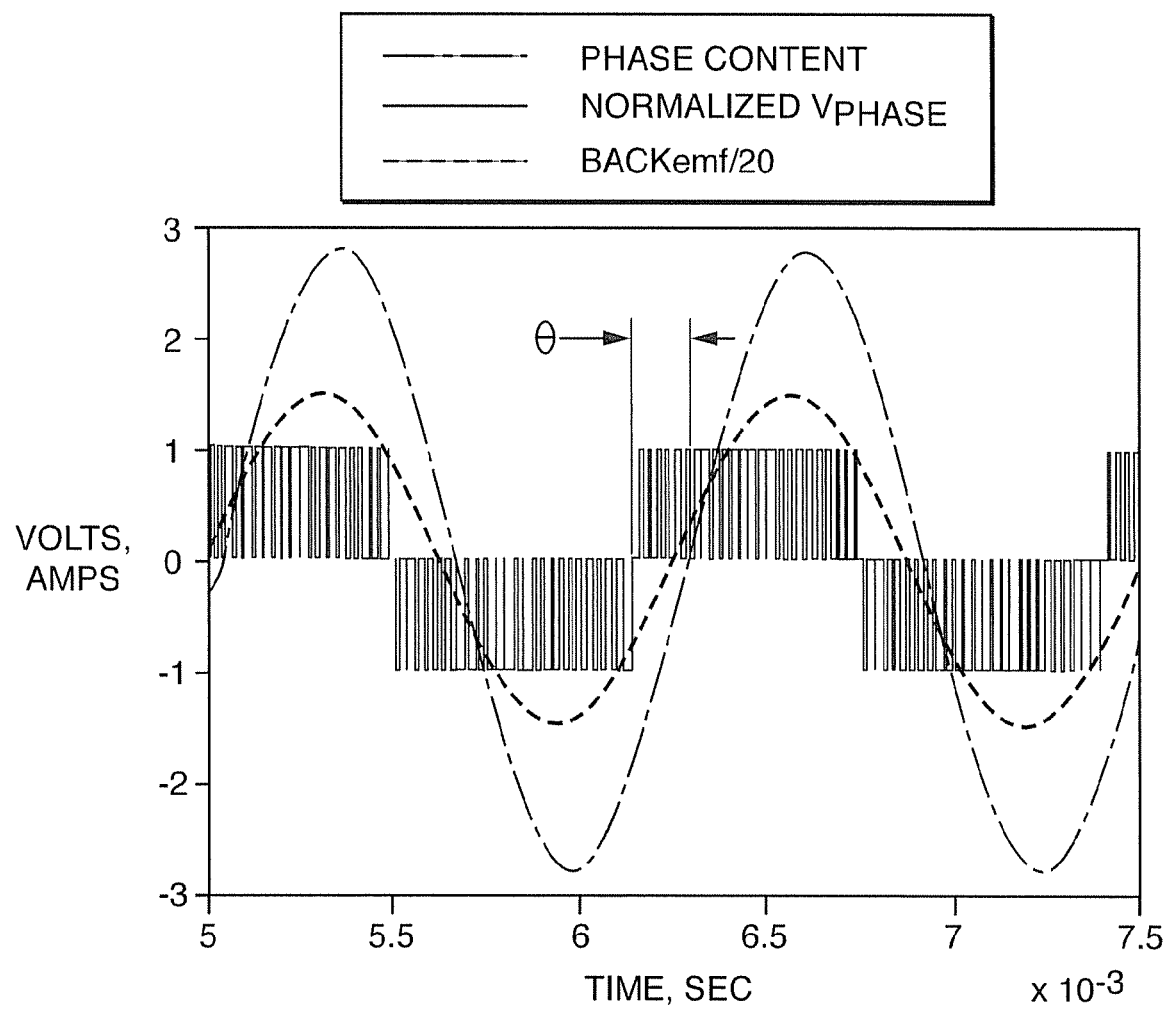
FIG. 3 illustrates sinusoidally driven stepper motor waveforms, used in one embodiment of the present disclosure.

FIG. 3 illustrates typical current and voltage waveforms in a sinusoidally driven stepper motor 130. The torque generated by the stepper motor driven with these types of sinusoidal currents can be described as a sum of torques generated by each phase:

$$\tau(t) = \tau_A(t) + \tau_B(t) = \frac{e_A(t)i_A(t) + e_B(t)i_B(t)}{\omega},$$  Equation 3

$$e_A(t) = E\sin(\omega t + \varphi),$$

$$e_B(t) = E\cos(\omega t + \varphi),$$

$$i_A(t) = I\sin(\omega t),$$

$$i_B(t) = I\cos(\omega t),$$

$$E = K_E \omega$$

In Equation 3 above:
E=peak value of backemf (Volt);
I=peak value of phase current (Amp);
$K_E$=backemf constant (Volt/rad/sec);
$\phi$=angle between current and backemf (rad).

The torque can be expressed as:

$$T = \frac{EI\cos\varphi}{\omega} = K_E I \cos\varphi$$  Equation 4

The mechanical power on the motor shaft is:

$$P_{mech} = T\omega = EI \cos\phi$$  Equation 5

In one embodiment of the present disclosure, the torque required from the motor can be found using an algorithm described below. The known parameters in this algorithm are: 1) the motor phase current $I_A$ that is known due to the current control algorithm; 2) the motor backemf constant $K_E$; 3) the motor resistance and inductance (R and L); and 4) the motor speed $\omega$.

The first step in the algorithm is to find the phase voltage $V_A$, using the above known parameters. The first harmonic of the phase voltage can be found by using the voltage duty cycles (known from the control algorithm) over a period of a sine wave:

$$V_A = V_{max} \sin(\omega t + \theta) \quad \text{Equation 6}$$

In the above equation, $V_{max} = D_{max} V_{bus}$; $D_{max}$ = maximum duty cycle; and $V_{bus}$ = bus voltage.

The angle ϕ between current and voltage can be found by Fourier analysis of the voltage waveform or by direct time measurement between zero duty cycle in voltage waveform and zero crossing of the current waveform.

The next step in the algorithm is to find real and imaginary parts of the backemfs $E_A$ ($Re(E_A)$, $Im(E_A)$).

From Equation 2 above, the real and imaginary parts are given as follows:

$$Re(E_A) = Re(V_A) - (R + \omega L_m)I$$

$$Im(E_A) = Im(V_A) - \omega LI \quad \text{Equation 7}$$

The algorithm then determines the phase ϕ as follows:

$$\varphi = \arctan \frac{Im(E_A)}{Re(E_A)} \quad \text{Equation 8}$$

Finally, the algorithm determines the delivered or produced torque, using Equation 4 above:

$$T = K_E I \cos \varphi$$

The torque delivered to the valve body 110 depends on a number of factors, including but not limited to the mechanical configuration of the valve, the velocity profile configuration of the valve, the magnitude of the position move, the friction condition of shaft seals, and the degree of contamination that has built up. The plot of torque vs. time will inherently have short peaks, for example during the acceleration portion of position moves. The information that is needed in order to determine whether or not there is a need for PM cleaning is how the magnitude of these peaks increases over time.

Figure 4:
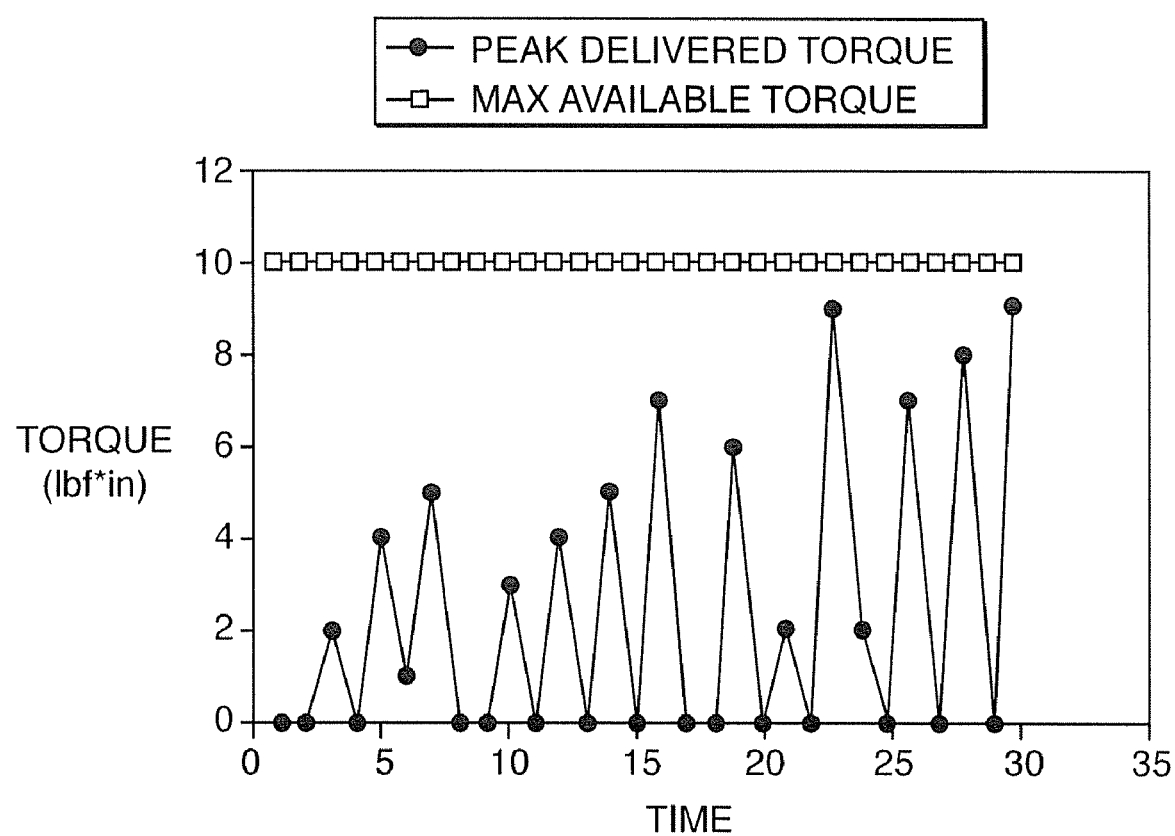
FIG. 4 compares the maximum available torque with the peak delivered torque, in a hypothetical peak torque log.

FIG. 4 compares the maximum available or sustainable torque with the peak delivered torque, in a hypothetical peak torque log. A number of methods may be used to process and extract the torque measurement information to provide a diagnostic for the user, including but not limited to the methods described below.

For example, in one embodiment the maximum available torque, or slip threshold, may be a pre-configured value. In another embodiment, the pressure control valve software may internally maintain a file that logs an array of time stamp and peak delivered torque. The peak delivered torque may be any peak value above a threshold, for example a given percentage of the threshold value or maximum available torque. This file could then be extracted by the user for further analysis.

In another embodiment, the controller may be configured to maintain in its memory the last peak value of the torque. The controller may be configured to allow a user to query this peak value on a regular interval (every wafer, for example), for example through a user interface. The controller may then reset the peak detect trigger. In this embodiment, the user is able to chart the peak value of torque for every wafer, and without requiring significant memory storage and management within the valve system.

In the above embodiment, the storage and querying may be managed by an external module other than the controller. One example of such an external module is the MKS Blue Box product and the corresponding database and statistical analysis software, manufactured by MKS Instruments, Inc.

The controller 140 may be configured to generate, once it has determined that the torque safety factor has reached a threshold value, an alarm signal that alerts the user of that the deposit build up has reached a level in which preventive maintenance is required. The alarm signal may include, but is not limited to: a Dnet alarm condition; a serial response; or activation of a mechanical relay.

Figure 5:
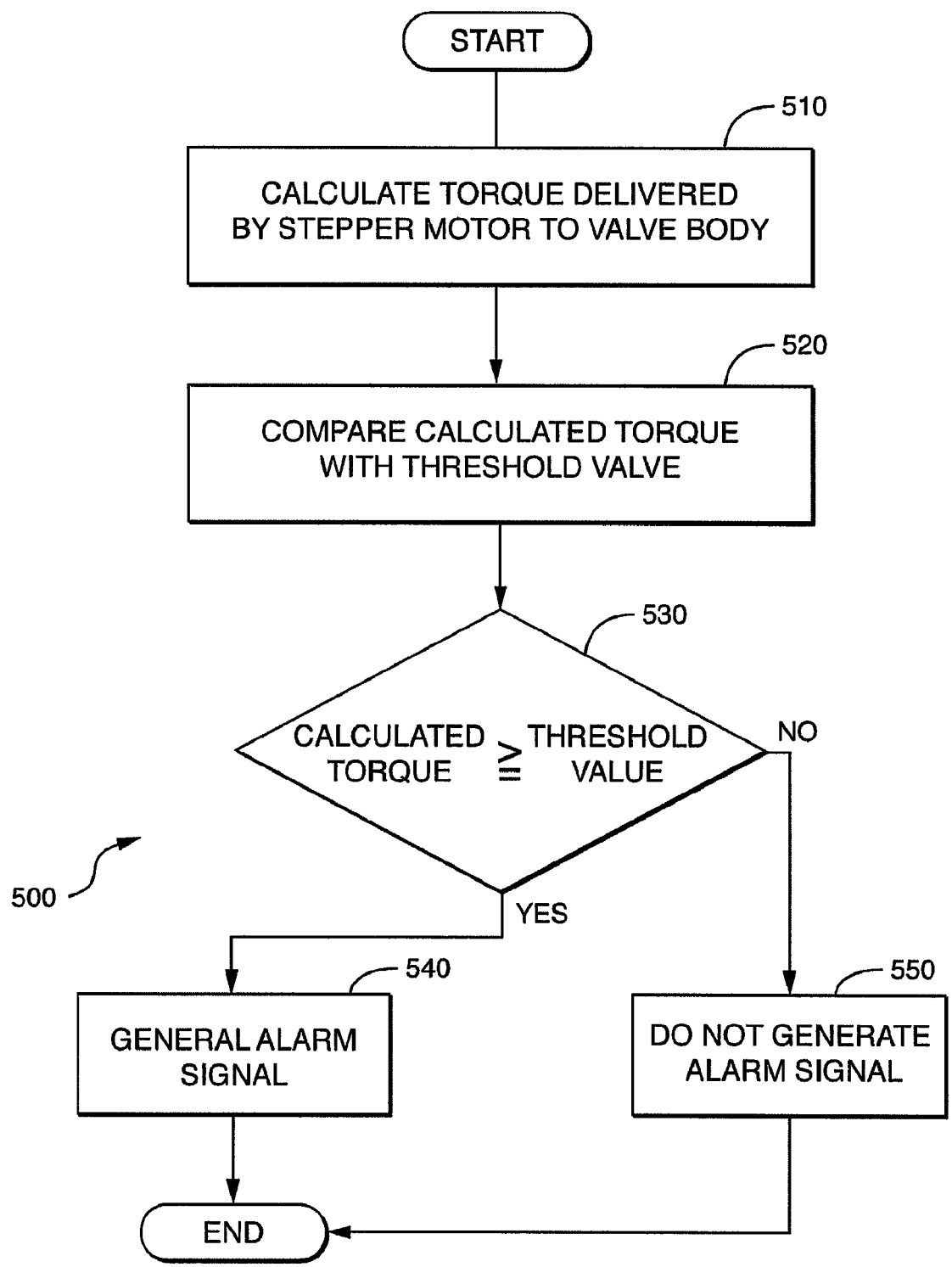
FIG. 5 illustrates a method of predicting when a valve system requires preventive maintenance, in one embodiment of the present disclosure.

FIG. 5 illustrates a method 500 of predicting when a valve system requires preventive maintenance, in one embodiment of the present disclosure. The method 500 includes an act 510 of calculating a torque delivered by the motor to the valve body, and an act 520 of comparing the calculated torque with a threshold value representing a maximum amount of torque available from the stepper motor. In act 530, if the calculated torque is greater than or substantially equal to the threshold value, the method determines that the valve system requires preventive maintenance, and proceeds to act 540, namely generates an alarm signal. If the calculated torque is less than the threshold value, the method determines that the valve system does not require preventive maintenance, and proceeds to act 550, namely does not generate an alarm signal.

In sum, systems and methods have been described that allow users to predict when a valve system (for example a pressure control valve system) needs preventive cleaning, using measurements of the torque delivered by the stepper motor.

While the specification describes particular embodiments of the present disclosure, those of ordinary skill can devise variations of the present disclosure without departing from the inventive concept.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether or not it is recited in the claims.

In short, the scope of protection is limited solely by the claims that now follow. That scope is intended to be as broad as is reasonably consistent with the language that is used in the claims and to encompass all structural and functional equivalents.

What is claimed is:

1. A valve system comprising:
   a valve, including a valve body and a motor configured to apply a torque to the valve body in response to a drive current so as to cause the valve body to move between an open position that allows a flow of a fluid, and a closed position that prevents the flow of the fluid, wherein the motor is a two-phase stepper motor; and
   a controller for the valve, the controller configured to control the application of the drive current to the motor and wherein the controller is configured to apply one or more phase currents to the stepper motor in each of the two phases of the stepper motor, the controller being configured (a) to determine the torque delivered by the motor to the valve body as a function of the voltage applied to the motor and compare the value of the determined torque with a threshold value, wherein determining the torque comprises computing a phase voltage in each phase of the stepper motor based on the currents applied to the stepper motor in each phase, computing the angle between the phase current and the phase voltage in each phase of the stepper motor, then computing the delivered torque as a product of a peak value of the phase current, the cosine of the angle, and a back emf constant, and (b) to detect when there is a need by the valve system for preventive maintenance when the value of the determined torque is substantially equal to the threshold value.

2. The valve system of claim 1, wherein the controller is further configured to generate, when the determined torque is substantially equal to the threshold value, a signal that is used to alert a user of the need for preventive maintenance by the valve system.

3. The valve system of claim 1, wherein the controller is further configured to maintain a file that logs a value of the peak delivered torque as a function of sequential time stamps.

4. The valve system of claim 1, wherein the valve system is a pressure control valve configured to control pressure of a fluid within a chamber by regulating flow of the fluid into or out of the chamber; and wherein the valve system is configured to allow the fluid to flow into or out of the chamber when the valve body is at the open position, and to prevent the fluid from flowing into or out of the chamber when the valve body is at the closed position.

5. The valve system of claim 1, wherein the valve system comprises at least one of:
   a pendulum valve;
   a butterfly valve; or
   a throttle valve.

6. The valve system of claim 1, wherein the threshold value represents a substantially maximum amount of torque available from the motor.

7. The valve system of claim 1, wherein the preventive maintenance comprises a cleaning of a surface of the valve system to prevent slippage of the motor and to prevent further deposit buildup on the surface.

8. The valve system of claim 1, wherein the controller is further configured to maintain in memory a last peak value of the delivered torque, and to respond to one or more user queries regarding the last peak value.

9. The valve system of claim 1, wherein the controller is further configured to compute the angle between the phase current and the phase voltage by a Fourier analysis of the waveform of the phase voltage.

10. The valve system of claim 1, wherein the controller is further configured to compute the angle between the phase current and the phase voltage by time measurement between zero duty cycle and zero crossing of the voltage waveform.

11. The valve system of claim 1, wherein the controller is further configured to compute the angle between the phase current and the phase voltage by computing the real and imaginary parts of the back emf during the first phase, then computing the angle as the arctangent of the ratio between the imaginary and real parts of the back emf.

12. The valve system of claim 1, wherein the threshold value is pre-configured.

13. A pressure control system for controlling pressure of a fluid in a chamber, comprising:
   a pressure sensor configured to measure the pressure of the fluid within the chamber;
   a valve configured to regulate flow of the fluid into or out of the chamber, the valve including a valve body and a motor configured to apply a torque to the valve body to cause the valve body to move between an open position that allows flow of a fluid, and a closed position that prevents flow of a fluid, wherein the motor is a two-phase stepper motor; and
   a controller, wherein the controller is configured to apply one or more phase currents to the stepper motor in each of the two phases of the stepper motor, and wherein the controller is configured (a) to drive the motor by applying a current to the motor, the controller being configured to determine the torque delivered by the motor to the valve body as a function of the voltage corresponding to at least one phase of the motor and compare the determined value of the torque with a threshold value, wherein determining the torque comprises computing a phase voltage in each phase of the stepper motor based on the currents applied to the stepper motor in each phase, computing the angle between the phase current and the phase voltage in each phase of the stepper motor, then computing the delivered torque as a product of a peak value of the phase current, the cosine of the angle, and a back emf constant, and (b) to detect when there is a need by the valve system for preventive maintenance when the calculated torque is substantially equal to the threshold value.

14. A method of determining when a valve system requires preventive maintenance, the valve system including a movable valve body and a motor, the method comprising:
   calculating a torque delivered by the motor to the valve body as a function of the voltage applied to the motor, wherein the motor is a two-phase stepper motor, and wherein calculating a torque comprises computing a phase voltage in each phase of the stepper motor based on the currents applied to the stepper motor in each phase, computing the angle between the phase current and the phase voltage in each phase of the stepper motor, then computing the delivered torque as a product of a peak value of the phase current, the cosine of the angle, and a back emf constant;
   comparing the calculated torque with a threshold value representing a maximum amount of torque available from the motor; and
   determining that the valve system requires preventive maintenance when the calculated torque is substantially equal to the threshold value.

* * * * *